Jan. 19, 1954 J. C. McCUNE 2,666,503
DISK BRAKE
Original Filed Aug. 12, 1948 2 Sheets-Sheet 2
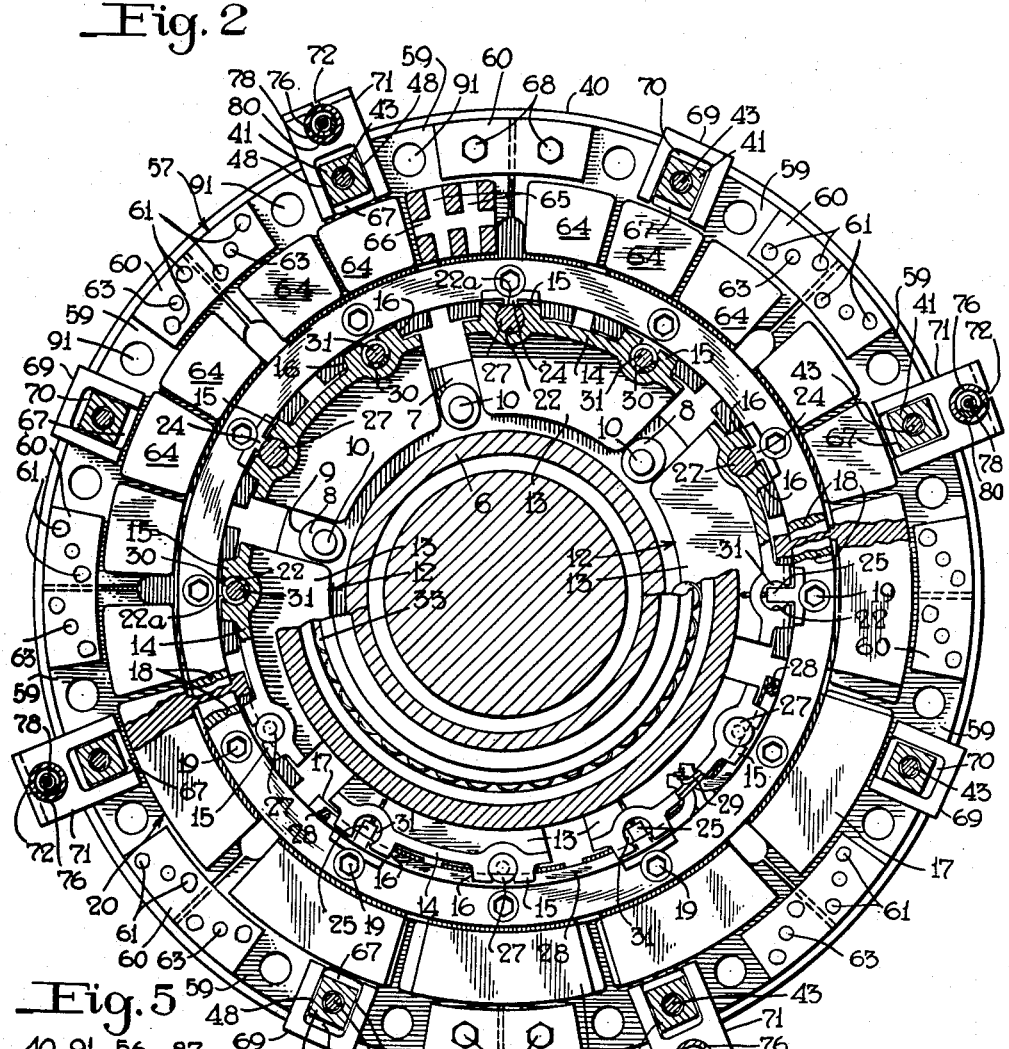
INVENTOR.
Joseph C. McCune
BY
Frank E. Miller
ATTORNEY Patented Jan. 19, 1954

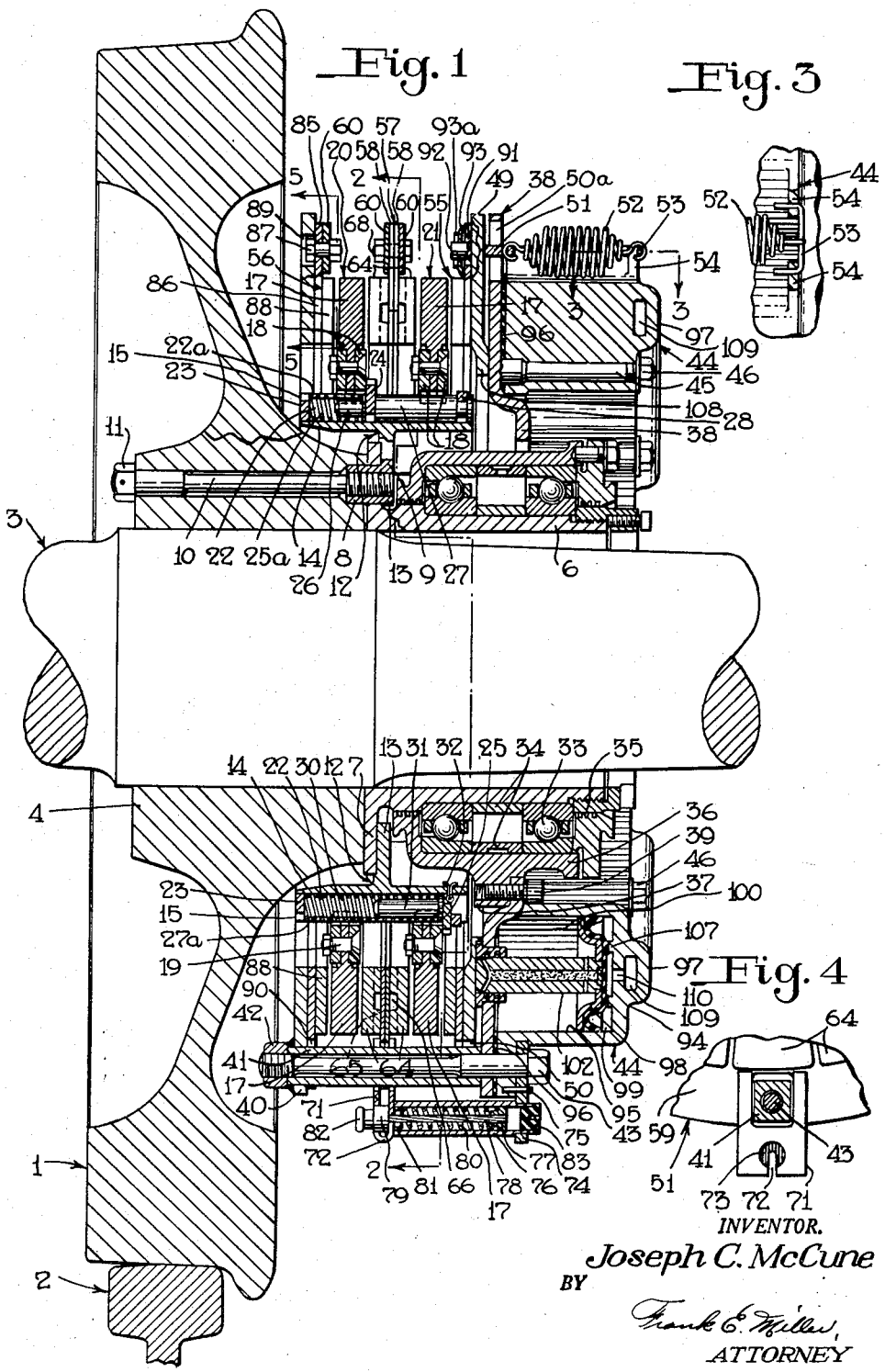

2,666,503

UNITED STATES PATENT OFFICE 2,666,503

DISK BRAKE

Joseph C. McCune, Edgewood, Pa., assignor to Westinghouse Air Brake Company, a corporation of Pennsylvania Original application August 12, 1948, Serial No. 43,913. Divided and this application May 14, 1949, Serial No. 93,319

17 Claims. (Cl. 188—72)

This invention relates to disk brake apparatus for railway vehicles or the like and more particularly to friction braking elements for use in such apparatus, the present invention being a division of my copending application Serial No. 43,913, filed August 12, 1948.

The principal object of the invention is the provision of improved, annular, friction braking elements for a brake apparatus of the above type.

Other objects and advantages will become apparent from the following, more detailed description of the invention.

In the accompanying drawings: Fig. 1 is a generally vertical cross-sectional view of a disk brake apparatus embodying the invention and shown applied around an axle to the inboard face of a railway vehicle wheel; Figs. 2 and 3 are sectional views taken on the lines 2—2 and 3—3 in Fig. 1; Fig. 4 is a face view of a portion of a brake element shown in section in Fig. 1; Fig. 5 is a sectional view taken on the line 5—5 in Fig. 1; and Fig. 6 is a sectional view taken on the line 6—6 in Fig. 5.

Description

As shown in the drawing, 1 designates one wheel of a wheel and axle assembly of a railway vehicle truck adapted to roll on a rail 2, and 3 designates the axle of said assembly, the wheel 1 having a hub 4 in which one end of said axle is mounted.

The disk brake mechanism embodying the invention comprises a cylindrical brake hub 6 mounted around the axle 3 in concentric relation therewith and provided at one end with an annular flange 7, the outer surface of which engages the inboard face of wheel hub 4 around said axle. The flange 7 is provided with a plurality of holes equally spaced apart and aligned with openings in the adjacent face of the wheel hub 4 (only one of said holes and openings being shown in the drawing), and disposed in each of these holes and extending into the aligned opening is a dowel 8. The outer face of each dowel 8 is provided with a head 9 for engaging flange 7 and said dowel is mounted on one end of a bolt 10 extending through the wheel hub 4 and having a nut 11 engaging the outboard face of the wheel hub, whereby the cylindrical brake hub 6 is rigidly secured to the wheel 1 for rotation therewith. The dowels 8 constitute means for turning the brake hub 6 by and with the wheel 1 and for transferring braking torque from said hub to said wheel, the bolts 10 being subject only to tension stresses for holding the dowel 8 and brake hub 6 in cooperative relation with the wheel 1.

A plurality, preferably six, of combined rotor guide and driving lugs 12 are equally spaced from each other around the brake hub flange 7. Each lug 12 comprises a flange 13 projecting radially from the interior surface of an arcuate driving portion 14 formed concentric to the hub flange 7. The flanges 13 of the driving lugs are secured to the inboard face of the brake hub flange 7, preferably by welding. On the outer face of driving portion 14 of each lug 12 there are two ribs 15 arranged parallel to the axis of the brake hub 6 and thereby to the axis of wheel 1, said ribs being equally spaced from each other and from adjacent ribs 15 on the adjacent driving lugs 12. Each rib 15 has opposite, parallel and generally radially disposed side guide surfaces 16 extending parallel to the axis of the brake hub 6. Encircling the guide lugs 12 and slidably mounted on the ribs 15 thereof are two spaced apart brake rotors 20 and 21.

Each of the brake rotors 20 and 21 comprise a plurality of individual brake shoes 17, one for each of the plurality of ribs 15, each brake shoe being in the form of a segment of a disk and having a slot open to its interior edge in which the respective rib 15 is disposed with the sides of said slot in sliding contact with the guide surfaces 16 of the respective rib. Two individual rotor brake shoes 17 are thus mounted on each guide lug 12, there being twelve shoes 17 on the six lugs 12.

Each of the brake shoes 17 is provided in each of its opposite sides with a recess spaced from the respective rib 15 and arranged concentric of the brake hub 6 and encircling the driving lugs 12 and disposed in these recesses in all the shoes 12 are a pair of rings 18, one disposed at each side of the shoes. The two rings 18 are rigidly secured to opposite sides of the shoes 12, and the shoes are thus clamped between said rings, by bolts 19, each extending through both rings 18 and each shoe. In assembling the rotor the bolts 19 are not tightened until after all of the brake shoes 17 and rings 18 are in place in order to insure proper alignment of said shoes with the respective ribs 15.

It will now be seen that each of the brake rotors 20 and 21, comprises a plurality of brake shoes 17 secured in spaced apart relationship to each other and in cooperative relation with the driving lugs 12 by the rings 18 and that brake torque between said shoes and the wheel 1 will be transmitted from each individual shoe to the respective rotor driving lug 12 and thus be independent of the rings 18, said rings merely acting to hold said shoes assembled to the driving lugs 12. It will be further apparent that the two rotors 20 and 21 are slidable on the drive lugs 12 in a direction parallel to the axis of wheel 1, axle 3 and the brake hub 6.

In each of the ribs 15 there is a bore 22 extending parallel to the length of the rib between the opposite guide surfaces 16 thereof and opening through a slot 22a to the outer face of the rib. The end of each bore 22 adjacent to wheel 1 is closed by a plug 23. The ring 18 mounted on the side of rotor 20 opposite the wheel 1 is provided with a plurality of stop fingers 24 extending through the respective slot 22a into each of the alternate bores 22, while the corresponding ring of rotor 21 is provided with like fingers 25 extending into the other bores 22.

In each of the bores into which the fingers 24 project there is interposed between said finger and the respective plug 23 a rotor release spring 25a bearing at one end against said plug and at the opposite end against one side of a follower 26 slidably mounted in the bore and having its opposite side in contact with the respective finger 24. At the opposite side of each finger 24 there is a stop pin 27 which adjacent the end opposite the wheel 1 is provided with a circular recess arranged to align with a slot in the outer surface of the respective rib 15 at either side of slot 22a, and encircling the several guide lugs 13 within said slots therein and within the recesses of the several stop pins 27 is an expansible retainer ring 28 for holding the several stop pins 27 in place. The two ends of the ring 28 are bent inwardly and tied together by a wire band 29 for holding said ring against moving out of the slots by centrifugal force upon rotation of the driving lugs 12 with the wheel 1. The springs 25 are under pressure for urging the fingers 24 against the stop pins 27 which act to define the brake release position of rotor 20.

A release spring 30 is disposed in each of the bores 22 into which the fingers 25 of rotor 21 project. One end of each spring 30 is supported on the respective plug 23 while the opposite end bears against one side of a follower 31, the opposite side of which bears against the respective finger 25 which is adapted to engage ring 28. The several springs 30 are under pressure for, through the medium of fingers 25, urging the rotor 21 to a brake release position defined by contact between said fingers and the ring 28. A cotter key 32 is secured in the wall of each of the bores 22 into which the fingers 25 of rotor 21 project, adjacent the end of said bores opposite the plugs 23, for engagement by the respective spring followers 31 when the ring 28 and rotor 21 are removed from the drive lugs 12 to prevent said followers being moved out of said bores by springs 30. No means such as key 32 is required in the other slots for the followers 26 therein will still be in their bores upon full expansion of the respective springs 25a.

The brake hub 6 carries two anti-frictional bearings 33 held in spaced relation by spacers 34 and secured to said hub by a retainer nut 35 having screw-threaded engagement with the end of said hub. Mounted on these bearings and thereby journaled on the hub 6 is a bearing housing 36 provided around its exterior surface with a plurality of outwardly extending lugs 37. Encircling the housing 36 is a combined stator and brake cylinder supporting ring 38 rigidly secured around its inner edge to the lugs 37 by bolts 39, said ring being disposed at the side of rotor 21 opposite the wheel 1. The housing 36 and ring 38 are adapted to be held against rotation by any suitable torque means (not shown).

Disposed at the side of rotor 20 adjacent wheel 1 is a stator retaining ring 40 encircling the axle 3 and wheel hub 4 and in concentric relation therewith and with the stator and brake cylinder supporting ring 38. Rigidly secured at one end to the retaining ring 40 and projecting therefrom into contact with the adjacent surface of ring 38 are a plurality of tie bars 41 equally spaced from each other, and extending through the latter ring and through each of said bars and having screw-threaded engagement with a nut 42 secured to the ring 40 is a bolt 43 for rigidly securing the ring 40 to and for holding it in a predetermined spaced relation from the ring 38.

The tie bars 41 are preferably square in section having opposite parallel sides 48 arranged generally parallel to the radii of rings 38 and 40.

Mounted against the side of ring 38 opposite the ring 40 are two equally spaced apart substantially semi-circular brake cylinder devices 44 which are secured around their outer edge to the ring 38 by the bolts 43 and around their inner edge by a plurality of bolts 45 secured at one end to the ring 39 preferably by welding and having on their opposite end a nut 46 engaging the brake cylinder device.

Mounted against the stator and brake cylinder supporting ring 38 between said ring and rotor 21 is a pressure ring 49 having a plurality of spaced apart slots 50 open to the outer edge and in which the tie bars 41 are disposed with the sides of said slots in sliding contact with the sides 48 of said tie bars whereby said ring is slidable on said bars in a direction toward and away from said rotor. Projecting from the side of the pressure ring 49 opposite rotor 21 through suitable openings 50a in the brake cylinder and stator support ring 38 are spring anchors 51 to each of which is connected one end of a stator release spring 52. The opposite end of each spring 52 is connected to a wire bail 53 at its center, the opposite ends of each bail being bent parallel to the axis of the spring and being disposed in openings provided in webs 54 of the brake cylinder devices 44.

Disposed between the pressure ring 49 and rotor 21 is a non-rotatable brake element or stator 55, disposed between the rotor 20 and the stator retaining ring 40 is an identical but oppositely arranged non-rotatable brake element or stator 56, while between the rotors 20 and 21 is disposed a third non-rotatable brake element or stator 57.

The brake stator 57 comprises two relatively thin, flat-sided metal rings 58 each of which is made up of ring segments 59, corresponding in number to the eight tie bars 41, and arranged in substantial end to end relation. The segments 59 are rigidly secured together by bridge pieces 60 overlapping adjacent segments and secured thereto by welds 61 except at two diametrically opposite connections which are effected by bolts as will be hereinafter described. It will thus be seen that each stator ring 58 is built up in two separate and like semi-circular parts with one end of a bridge piece 60 at one end of each part over-lapping the end of the other part for connection by the bolt with the segment 59 at the opposite end of the other part. For simplicity of manufacture all of the segments 59 are of identical structure, as well as are the bridge pieces 60, in that all are provided with holes 63 for the reception of a bolt, to be hereinafter described, if used at the end of the two semi-circular parts of the ring.

Secured by welding to one side and adjacent to the inner edge of each segment 59 are three spaced apart friction brake shoes 64 for frictional braking contact with the adjacent braking face of rotor 20 or 21. Each of the brake shoes 64 is provided with two spaced radially extending air ducts 65 and a transverse air duct 66 cutting the radial ducts 65, said ducts being open to the face of the shoe adjacent the ring 58 and being provided to permit circulation of air currents to dissipate heat from the shoe incident to braking. Each of the ring segments 59 is also provided midway between its ends with a parallel sided slot 67 open to the outer edge thereof to receive one of the tie bars 41 upon all of which the stator 57 is mounted to slide axially.

The two rings 58 of the stator 57 are arranged back to back with the brake shoe 64 and bridge pieces 60 on the outer or opposite faces, and the two semi-circular parts of each ring are rigidly secured at each end to each other and to the corresponding parts of the other ring by two bolts 68 extending through the aligned holes 63 in the adjacent ring segments 59 and overlying ends of the respective bridge pieces 60, it being noted that while only one bolt 68 is required at each end to connect together two halves of either one of the rings that two bolts 68 are required for two rings arranged back to back as with stator 57.

A U-shaped clip 69 is fitted from the outer edges over each alternate aligned pair of segments 59 of the two rings 58 and rigidly secured thereto by welding, a slot 70 being provided in each leg of the clip with opposite parallel sides aligned with the sides of the slots 67 in the respective segments 59 to provide a relatively wide bearing surface for sliding contact with the respective tie bar 41. Similar clips 71 are secured to the other aligned pairs of segment 59 of the two rings 58 for the same purpose, but the clips 71 also extend beyond the outer edge of the rings, and in the extending portion thereof each of these clips is provided with a slot 72 extending radially of the stator into the clip a chosen distance in one leg of the clip and to a bore 73 through the other leg.

The stator 57 is mounted between the rotors 20 and 21 with each of the tie bars 41 disposed in the aligned slots 67 of one pair of back to back arranged ring segments 59, said bars carrying said stator and having sliding contact with the side walls of said slots and with the legs of the respective clips 69 or 71, the bore 73 in the clips 71 being disposed at the side of the stator opposite the rotor 21.

Four removable lugs 74 aligned with the clips 71, are rigidly clamped to the outer webs 54 of the brake cylinder devices 44 by the bolts 43, a dowel pin 75 carried by said webs cooperating with said lugs for locating same. Secured at one end to the outer end of each lug 74 and projecting therefrom over and parallel to the respective tie bar 41 is a tubular stop element 76 the opposite end of which is arranged for contact by the respective clip 71 for limiting movement of the stator 57 in the direction away from wheel 1 and for therefore defining a brake release position of said stator. Slidably mounted in each stop element 76 is a plunger 77 secured to one end of a flexible cable 78 extending through said element into slot 72 in the respective clip 71 and connected at the opposite end to a button 79 disposed in hole 73 through the one leg of the respective clip 71 and engaging the other leg around the slot 72 therein. A spring 80 contained in each stop member 76 bears at one end against the plunger 77 while its opposite end is supported by a seat member 81 secured in the stop member 76 and through which the cable 78 extends. The springs 80 are under pressure and through the medium of the respective cables 78 and buttons 79 are adapted to act on the clips 71 for constantly pulling the rotor 57 to its brake release position.

With the buttons 79 disposed in the holes 73 of one leg of clips 71 it will be apparent that they are securely held therein by springs 80. Each button 79 is provided with an external knob 82 for a workman to grasp for pulling said button out of the hole 73 against the force of spring 80 and for then moving cable 78 outwardly through the slot 72 for disconnecting the button from the clip 71. The end of each stop element 76 opposite that provided for engagement by the respective clip 71 is closed by a plug 83 for preventing entrance of foreign matter into said stop.

The stator 56 comprises a ring 85 made up of segments 86 rigidly secured together into two semi-circular parts by welding of bridge pieces 60, the ends of the two parts being rigidly secured together to form a solid ring by a single bolt 87 at each end extending through the overlapping bridge piece 60 of one part and the ring segment 86 of the other part. The stator retainer plate 40 against which the stator 56 is shown abutted in the drawing is provided with suitable holes 89 (one being shown in the Fig. 1 of the drawings) for receiving the heads of bolts 87 which secure the two parts of the stator together. The segments 86 and bridge pieces 60 are identical to the segments 59 and bridge pieces 60 employed in the stator 57 except that said segments are made of slightly thicker metal.

Welded to the same side of each of the ring segments 86 as engaged by the bridge pieces 60 are three spaced apart brake shoes 88 which are identical to the brake shoes 64 on stator 59 except less the air ducts 65 and 66.

Each ring segment 86 has a slot 90 open to the outer edge for receiving one of the tie bars 41, which bars coacting with all of the segments 86 support the stator in working relation with the adjacent rotor 20 and hold it against rotation relative to the retaining plate 40.

The segments 59 and 86 of the stators 57, 56 are preferably punched from sheet metal on the same press, and at each side of the slot 67, 90 therein there is provided a hole 91. These holes 91 have no function in the stator 57, but in the stator 56 four of these holes, equally spaced apart, are adapted to receive lugs 92 welded at one end to the retainer ring 40 and which extend through the holes. Mounted over each of the lugs 92 against ring 85 is a spring washer 93 which is held under compression against the ring 85 by a cotter key 93a extending through the lug. The purpose of this construction is to hold the stator 56 against chattering on the retainer ring 40 when the stator 57 is out of contact with the adjacent rotor 20.

The stator 55 is the same in construction as stator 56, but reversely arranged, with its ring segments 86 connected with the tie bars 41 for holding the stator against turning relative to said bars, and lugs 92 projecting from the pressure ring 49 through the holes 91 in said segments and carrying spring washers 93 and cotter keys 93a are provided for holding said stator against said pressure ring against chattering thereon.

The two brake cylinder devices 44 may be identical, oppositely arranged, and somewhat less than semi-circular structures, one located above and the other below a horizontal plane including the axis of axle 1. Each of the brake cylinder devices comprises six equally spaced apart cylinders 94 the bores 95 of which (only one being shown in the drawing) are open at one end to the adjacent face of the stator and brake cylinder supporting ring 38, with a gasket 96 interposed between said ring and the adjacent end of said cylinders for excluding foreign matter from the bores 95.

Slidably mounted in each of the bores 95 is a piston 98 between which and an integral cover 97 for the opposite end of said bore there is provided a pressure chamber 99. At the opposite side of piston 98 is a non-pressure chamber 100. Projecting from the piston 98 through the non-pressure chamber 100 is a piston rod 102 the end of which, opposite that connected to piston 98, contacts the adjacent face of the pressure ring 49.

A brake release position of the brake cylinder piston 98 is adapted to be defined by engagement of said piston with a stop lug 107 provided on cover 97, and in this position, the release position of the pressure ring 49 may be defined by engagement of an outturned flange 108 at the inner edge of said ring with the stator and brake cylinder support ring 38.

In each brake cylinder device 44 the brake cylinder cover 97 is provided with a raised portion containing an air passage 109 extending over the several cylinder bores 95 and open to each of said bores by a passage 110, the two air passages 109 being adapted to be connected to any conventional brake controlling valve device for controlling supply and release of fluid under pressure to said bores and thereby pressure chambers 99.

In operation, assuming that the several brake cylinder pressure chambers 99 in both brake cylinder devices 44 are open to atmosphere, the several springs 52 connected to pressure ring 49 will hold the flange 108 of said ring in contact with the support ring 38 and thereby hold the several brake cylinder pistons 98 in substantial contact with their stop rib 107, thereby positioning both said pistons and the stator 55, which is secured for movement with the pressure ring 49, in the brake release position. With the stator 55 thus positioned the springs 30 will move the rotor 17 to its brake release position in which it is shown in the drawing spaced away from the stator 55, and the springs 80 connected to the center stator 58 and springs 25a acting on rotor 20 will position said stator and rotor in their brake release position as shown in the drawing and in which they are disengaged from the brake elements at either side thereof.

Now in order to render the brake mechanism effective to brake wheel 1 fluid under pressure will be supplied to the brake cylinder pressure chambers 99 in both brake cylinder devices 44. When the pressure of fluid thus obtained in chambers 99 and acting on the pistons 98 in opposition to springs 52 becomes increased to a degree sufficient to overcome said springs, said pistons, through the medium of rods 102, will slide the pressure ring 49 and thereby the associated stator 55 along the tie bars 41 into contact with the rotor 21. Further movement of the pistons 98 will then slide rotor 21 along ribs 15 on the guide lugs 12 into contact with the central stator 57 and then slide said stator along the tie bars 41 into contact with the rotor 20 which then will be moved along said ribs into contact with the end stator 56, the several stators being thus urged into frictional contact with the opposite sides of the two rotors 20 and 21 which will create a drag on said rotors to effect braking of wheel 1 to a degree determined by the pressure of fluid provided in the brake cylinder pressure chambers 99. Any desired degree of braking of wheel 1 may be obtained by providing the proper pressure of fluid in the brake cylinder pressure chambers 99, as will be apparent.

When it is desired to release the brakes fluid under pressure will be released from the several piston chambers 99, whereupon the springs 52 will return the pressure ring 49, and thereby the stator 55 and the several brake cylinder pistons 98 to their release positions, during which movement, springs 80, 30 and 25a will return the stator 57 and the rotors 20, 21 to their brake release positions in which they are shown in the drawing and in which they are disengaged from each other, in order to permit free turning of the wheel 1.

Maintenance

In order to replace any one of the stators 55, 56 or 57 or to renew the brake shoes 17 in the rotors 20, 21, the bolts 43 extending through the tie bars 41 will be removed as well as the bearing retainer nut 35 whereupon the brake cylinder devices 44 and the support ring 38 therefore may be moved back on the axle 3 away from the other parts of the brake apparatus.

The pressure ring 49 and connected stator 55 can then be pulled off the tie bars 41 and the stator removed from said ring and replaced with a new stator. In order to renew the shoes on rotor 21 all that is then necessary is to remove the bolts 19 securing the rotor rings 18 to opposite sides of said shoes whereupon said shoes can be replaced.

In order to renew the stator 57 it will be necessary to cut the wire band 29 holding together the adjacent ends of ring 28 and then remove said ring from the rotor drive lugs 12, whereupon the rotor 21 can be removed. The stator 57 can then be removed from the axle by removal of bolts 68 and replaced by a new stator, and if desirable the shoes 17 of the rotor 20 can be renewed in the same manner as the shoes of rotor 21. Also, the stator 56 can then be replaced if desirable following which all the parts can be reassembled in the reverse order.

Summary

It will now be seen that I have provided a disk brake mechanism embodying rotatable and non-rotatable brake elements, or rotors and stators respectively, which are rugged but relatively simple and inexpensive to construct and which may be readily repaired or replaced.

Having now described the invention, what I claim as new and desire to secure by Letters Patent, is:

1. A brake disk for a disk brake apparatus comprising a plurality of disk segments arranged in substantial end-to-end relation, one or more brake shoes secured to each of said segments, a bridge piece overlying adjacent ends of each adjacent pair of segments and welded thereto except at two connections between two bridge pieces and segments arranged at diametrically opposite parts on said disks, each of said bridge pieces having two spaced apart bores for alignment with bores in the underlying segments, and a bolt in the aligned bores in the bridge pieces and segments not welded together securing same together.

2. A non-rotatable brake disk for use either as an intermediate or end stator of a pile of interleaved rotatable and non-rotatable brake disks, comprising a plurality of segments arranged in substantial end-to-end relation, one or more brake shoes secured on one face of each of said segments adjacent the inner edge thereof, a bridge piece overlying adjacent ends of each adjacent pair of segments and welded thereto except at two connections between two bridge pieces and segments arranged diametrically opposite on said disks, each of said bridge pieces having two spaced apart bores for registry with bores in the underlying segments to receive bolts at the unwelded connections, a slot in each segment adjacent the outer edge thereof, and a hole through each segment at each of the opposite sides of the slots therein.

3. A non-rotatable brake element for a disk brake apparatus, comprising a pair of coaxially arranged ring-like means arranged in back-to-back relation, a plurality of segmental brake shoes secured in spaced apart relation to each of the opposite faces of said pair of ring-like means, a plurality of spaced apart slots in each of the two ring-like means having opposite, parallel, wear side walls extending generally radially of the ring-like means and aligned with the wear sides of the slots in the other ring, a clip extending over the opposite sides of both ring-like means at each of the respective pairs of aligned slots and welded to said rings, and a slot in each leg of each clip having side walls aligned with said wear side walls of the respective aligned slots in the ring-like means.

4. A non-rotatable brake element for a disk brake apparatus comprising a pair of coaxially arranged ring-like means arranged in back-to-back relation, a plurality of segmental brake shoes secured in spaced apart relation to each of the opposite faces of said pair of ring-like means, a plurality of spaced apart slots in each of the two ring-like means having opposite, parallel, wear side walls extending generally radially of the ring-like means and aligned with the wear sides of the slots in the other ring, a clip extending over the opposite sides of both ring-like means at each of the respective pairs of aligned slots and welded to said rings, and a slot in each leg of each clip having side walls aligned with said wear side walls of the respective aligned slots in the ring-like means, certain of said clips extending beyond the outer edge of said brake element and comprising means for shifting said brake element axially.

5. A non-rotatable brake disk for a disk brake apparatus comprising a pair of coaxially arranged ring-like means arranged in back-to-back relation, each of said ring-like means comprising a plurality of disk segments arranged in substantial end-to-end relation, one or more brake shoes arranged on the outer face of each segment and adjacent the inner edge thereof, a bridge piece overlying adjacent ends of each adjacent pair of segments and welded thereto except at two connections between two bridge pieces and segments arranged diametrically opposite on said disks, each of said bridge pieces having two spaced apart bores for registry with bores in the underlying segments, bolts extending through the aligned bores in the two bridge pieces and segments arranged diametrically opposite of the two ring-like means rigidly securing the two ring-like means to each other, a plurality of spaced apart slots in each of said ring-like means open to the outer edge thereof, the opposite parallel wear sides of each slot extending generally radially of the respective ring-like means and aligned with the wear sides of the slot in the other ring-like means, a clip extending over the opposite sides of both ring-like means at each of the respective pairs of aligned slots and welded thereto, and a slot in each leg of each clip having side walls aligned with the wear sides of the respective slots in the two ring-like means.

6. An annular rotatable friction brake element for a disk type of brake apparatus comprising a plurality of arcuate brake shoes arranged in a circle in spaced apart end to end relation and each having a radially extending friction surface adjacent its outer edge, torque means projecting radially inward from the inner peripheral edge of each shoe and having a driving surface arranged parallel to a radius of said brake element and at right angles to said friction surface, a removable ring encircling the driving surfaces of the torque means and encircled by the friction surfaces of the shoes, and removable means securing each torque means and thereby the respective brake shoe to said ring against outward movement by centrifugal force.

7. An annular rotatable friction brake element for a disk type of brake apparatus comprising a plurality of arcuate brake shoes arranged in a circle in spaced apart end to end relation and each having a radially extending friction surface adjacent its outer edge, torque means projecting radially inward from the inner peripheral edge of each shoe and having a driving surface arranged parallel to a radius of said brake element and at right angles to the respective friction surface, a removable ring of less diameter than and arranged coaxial with the friction surfaces of said shoes, each torque means comprising two spaced apart arcuate walls arranged coaxial to the respective brake shoe friction surface and defining a recess to receive said ring, and removable means securing said ring in said recess of each torque means for holding the respective torque means and shoe against outward movement by centrifugal force.

8. An arcuate brake element for a rotor of a disk brake mechanism comprising an outer shoe portion having on opposite faces parallel arranged radially extending braking surfaces, and an inner portion comprising torque means projecting radially inward from the inner peripheral edge of said shoe portion and having a driving surface arranged parallel to a radius of said shoe portion and at right angles to said braking surfaces, said inner portion comprising in one side between said driving surface and braking surfaces a pair of spaced apart walls arranged coaxial with the outer arcuate edge of said shoe portion and defining opposite sides of a recess extending in the direction of the circumference of said rotor, and means defining a bolt receiving bore extending through said inner portion and opening to said recess in a direction parallel to the axis of said rotor.

9. A disk brake apparatus comprising an annular rotatable member to be braked, a plurality of ribs on and spaced apart around and extending parallel to the axis of said member, and a rotatable friction brake element comprising a plurality of individual brake shoes arranged in end to end and spaced apart relation in a circle around said member and each comprising a pair of spaced apart torque lugs extending radially inwardly therefrom and disposed one on either side of and having driving connections with, respectively, opposite sides of one of said ribs, removable ring means encircling said member, and securing means removably securing each of said brake shoes to said ring means.

10. A disk brake apparatus comprising an annular rotatable element to be braked, a plurality of segmental brake elements encircling said rotatable element in spaced apart end to end relation and each having adjacent its outer edge a braking surface, said rotatable element and brake elements comprising cooperating driving means encircled by the braking surfaces of said brake elements for turning said brake elements with said rotatable element and removable means securing each brake element to said rotatable element against movement radially outward relative to said rotatable element.

11. A disk brake apparatus comprising an annular rotatable element to be braked, a plurality of segmental brake elements encircling said rotatable element in spaced apart end to end relation and each having adjacent its outer edge a braking surface, said rotatable element and brake elements comprising cooperating driving means encircled by the braking surfaces of said brake elements for turning said brake elements with said rotatable element, a ring encircled by said braking surfaces and encircling said driving means and disposed in contact with said brake elements and removable means securing each brake element to said ring against movement radially outward relative to said rotatable element.

12. A disk brake apparatus comprising an annular rotatable element to be braked, a plurality of torque ribs spaced from each other around and projecting from the peripheral face of said element and extending parallel to the axis of said element, a plurality of segmental brake elements corresponding in number to said ribs and spaced apart in end to end relation in a circle around said rotatable element, each of said brake elements comprising a pair of spaced apart lugs projecting radially inward from the inner peripheral edge of the brake element and disposed one on either side of and in sliding contact with opposite sides of the respective torque rib, and removable means securing said brake elements against radial outward movement on the respective torque ribs.

13. A disk brake apparatus comprising an annular rotatable element to be braked, a plurality of torque ribs spaced from each other around and projecting from the peripheral face of said element and extending parallel to the axis of said element, a plurality of segmental brake elements corresponding in number to said ribs and spaced apart in end to end relation in a circle around said rotatable element, each of said brake elements comprising a pair of spaced apart lugs projecting radially inward from the inner edge of the brake element and disposed one on either side of and in sliding contact with opposite sides of the respective torque rib, a ring encircling said torque ribs and encircled by said brake elements, and removable means securing each of said brake elements to said ring.

14. A disk brake apparatus comprising an annular rotatable element to be braked, a plurality of torque ribs spaced from each other around and projecting from the peripheral face of said element and extending parallel to the axis of said element, a plurality of segmental brake elements corresponding in number to said ribs and spaced apart in end to end relation in a circle around said rotatable element, each of said brake elements comprising a pair of spaced lugs projecting radially inward from the inner edge of the brake element and disposed one on either side of and in sliding contact with opposite sides of the respective torque rib, a ring encircling said torque ribs, each of said brake elements having an arcuate recess adjacent the respective lugs for receiving said ring, and removable means securing said ring to each brake element within said recess.

15. A disk brake apparatus comprising an annular rotatable member to be braked, a plurality of ribs extending parallel to the axis of said member and arranged in spaced apart relation, said member also having a plurality of spaced apart slots arranged parallel to said ribs, a rotatable friction brake element slidably mounted on said ribs and having a brake release position, a plurality of spaced apart fingers on said brake element extending into certain of said slots, a spring in each of said certain slots acting on the respective finger for urging said brake element to said brake release position, a removable stop in each of said certain slots engageable by said fingers for defining said release position, said rotatable member having in each rib a circumferentially extending groove aligned with the grooves in the other ribs and each of said stops having a recess for circumferential alignment with the grooves in the adjacent ribs, and a removable ring encircling said member and disposed in said grooves and recesses for holding said stops in said rotatable member.

16. A disk brake apparatus comprising an annular rotatable member to be braked, a plurality of spaced apart ribs arranged around said member and extending parallel to the axis thereof and each rib having a slot extending parallel to the rib, a brake shoe for each rib slidably mounted thereon, ring means encircling said member and comprising a plurality of spaced fingers disposed in certain of said slots, one bolt securing each brake shoe to said ring means for rendering said ring means effective to hold the brake shoes in spaced relation, a removable ring encircling said member disposed in recesses in said ribs for engagement by said fingers to define a brake release position of the shoes, a spring follower in each of said certain slots engaging the respective finger, a spring disposed under pressure in each of said certain slots acting on the respective follower for urging the respective finger into engagement with said ring, and a removable element extending into each of said certain slots for engagement by the respective followers to hold them and the respective springs in the slots upon removal of said ring.

17. A disk brake apparatus comprising an annular rotatable member to be braked, a plurality of spaced apart ribs arranged around said member and extending parallel to the axis thereof and each rib having a slot extending parallel to the rib, a pair of annular rotatable brake elements encircling said ribs and spaced apart axially and each comprising a brake shoe having torque lugs slidably engaging the sides of one of said ribs, ring means encircling said member, a bolt securing each brake shoe to said ring means, a plurality of spaced apart fingers projecting inwardly from said ring means, the fingers of one of said brake elements being disposed in certain of said slots and the fingers of the other brake element being disposed in the other slots, each of said ribs having a circumferentially extending groove aligned circumferentially with the grooves in the other ribs, a removable ring encircling said member disposed in all of said grooves, a spring in each of said certain slots acting on the fingers therein for urging them into engagement with said ring to define a brake release position of the respective brake element, a removable stop in each of said other slots having a recess to receive said ring for holding the stop in the slots, and a spring in each of said other slots acting on the respective fingers for urging them into engagement with the respective stop for defining a brake release position of the respective brake element.

JOSEPH C. McCUNE.

References Cited in the file of this patent

UNITED STATES PATENTS

| Number | Name | Date |
| --- | --- | --- |
| 1,683,806 | Richards | Sept. 11, 1928 |
| 2,277,106 | Hewitt | Mar. 24, 1942 |
| 2,284,253 | Baselt et al. | May 26, 1942 |
| 2,318,620 | Nutt | May 11, 1943 |
| 2,423,881 | Du Bois | July 15, 1947 |
| 2,485,082 | Bachman | Oct. 18, 1949 |